(12) United States Patent
Nazarov et al.

(10) Patent No.: US 12,494,909 B1
(45) Date of Patent: Dec. 9, 2025

(54) METHOD AND APPARATUS FOR PRODUCING VERIFIABLE RANDOMNESS WITHIN A DECENTRALIZED COMPUTING NETWORK

(71) Applicant: SmartContract Chainlink Limited SEZC, Grand Cayman (KY)

(72) Inventors: Sergey Nazarov, Grand Cayman (KY); Alex Coventry, Grand Cayman (KY); Ari Juels, Grand Cayman (KY)

(73) Assignee: SmartContract Chainlink Limited SEZC, Grand Cayman (KY)

( * ) Notice: Subject to any disclaimer, the term of this patent is extended or adjusted under 35 U.S.C. 154(b) by 840 days.

(21) Appl. No.: 17/317,490

(22) Filed: May 11, 2021

Related U.S. Application Data

(60) Provisional application No. 63/023,221, filed on May 11, 2020.

(51) Int. Cl.
| | | |
|---|---|---|
| *H04L 29/06* | (2006.01) | |
| *G06F 7/58* | (2006.01) | |
| *H04L 9/30* | (2006.01) | |

(52) U.S. Cl.
CPC ............. *H04L 9/30* (2013.01); *G06F 7/588* (2013.01)

(58) Field of Classification Search
CPC ....... H04L 9/30; H04L 9/0816; H04L 9/3218; H04L 9/00; H04L 12/2821; H04L 12/40104; H04L 63/062; H04L 63/12; H04L 2209/12; G06F 7/588; G06F 7/58; G06F 7/582; G06F 15/785; G06F 18/2185; G01D 5/2495; G07B 2017/00919; G05B 2219/33276; G06V 10/7792

See application file for complete search history.

(56) References Cited

U.S. PATENT DOCUMENTS

| | | | |
|---|---|---|---|
| 2020/0074552 A1 | 3/2020 | Shier et al. | |
| 2020/0311312 A1 | 10/2020 | Yu et al. | |
| 2020/0320340 A1* | 10/2020 | Wentz | ............. G06F 9/465 |
| 2024/0414228 A1 | 12/2024 | Cao et al. | |

OTHER PUBLICATIONS

Berger et al., "OraclesLink: An architecture for secure oracle usage", IEEE, 978-1-7281-8370, pp. 66-72 (Year 2020).

* cited by examiner

*Primary Examiner* — Joseph P Hirl
*Assistant Examiner* — Leynna Truvan
(74) *Attorney, Agent, or Firm* — Potomac Law Group, PLLC; Marc S. Kaufman

(57) ABSTRACT

A system and method for providing a randomness function to a smart contact on a decentralized network. An oracle receives a request for at least one random value to be supplied to a smart contract executing on a decentralized network, the request including a seed. The oracle generates the at least one random value based on the seed, and a secret key associated with the oracle, wherein the oracle is identified on the decentralized network by a public key associated with the secret key. The oracle generates a cryptographic proof based on the at least one random value and the public key and sends the at least one random value and the cryptographic proof to the decentralized network, whereby the proof, and thus the randomness of the at least one random value, can be verified.

21 Claims, 2 Drawing Sheets

METHOD AND APPARATUS FOR PRODUCING VERIFIABLE RANDOMNESS WITHIN A DECENTRALIZED COMPUTING NETWORK

BACKGROUND

A distributed ledger (also called a shared ledger or distributed ledger technology or DLT) is a consensus of replicated, shared, and synchronized digital data distributed across multiple computing nodes. In many implementations of distributed ledgers, such as the Bitcoin Blockchain, there is no central trusted authority. Therefore, distributed ledgers are often referred to as "decentralized networks."

The distributed ledger database can be replicated across multiple nodes (potentially many thousands of nodes) communicating over a peer-to-peer network. Each node can replicate a copy of the ledger update themselves with the new, correct copy of the ledger using one or more of various known consensus algorithms. Security can be accomplished through cryptographic keys and signatures. The application of distributed ledgers, such as blockchains, has been proposed for various financial transactions, such as funds transfers and equities trading, and for a myriad of other applications in which it is desirable to be able to transact directly without the need for a trusted centralized party, such as a bank or a government entity. The combination of a peer-to-peer distributed ledger, consensus algorithms and cryptographic techniques results in an immutable record; data can be added to the ledger but, once the data is agreed on by the participants, the data cannot be removed from the ledger or changed on the ledger.

A "smart contract" is computer executable code that is stored and executes, at least in part, on a decentralized network. It is known to use smart contracts to effect various business processes in a predictable manner. Smart contracts have been utilized to effect various critical processes, such as foreign exchange, insurance claims payment, settlement of bets and the like. Typically, a smart contract will receive one or more inputs and generate an output. As a very simple example, a smart contact can receive weather precipitation data and make payments to insured farmers if the precipitation over a predetermined period of time is less than a threshold value. Nodes providing external input data to a smart contract, such as the weather data in the example above, are known as "oracles." Smart contracts can be the basis for decentralized applications (Dapps) which provide various functions to users over a decentralized network.

In many applications, randomness is required for security without compromising the verifiable deterministic operation of a smart contract. It is well known to leverage randomness for computer data security. For example, SSL encryption, which secures the internet, relies on randomness. Various random number generation algorithms are well known and can be applied by a centralized/trusted entity. As an example, CLOUDFLARE™ uses hundreds of lava lamps to generate random numbers. A camera takes photos of the lamps at regular intervals and sends the images to Cloudflare servers. The digital image data is treated as a string of random numbers that the Cloudflare servers can then use for creating secure encryption keys.

In a decentralized system, randomness must come from participants in the network. Such participants cannot always be trusted. Network participants could manipulate the "randomness" for their own benefit. Existing solutions for providing randomness to smart contracts have significant limitations. For example, the use of existing on-chain data like a blockhash, and/or various off-chain randomness both present limitations. For example, suppose a contract makes decisions based on the parity of the last bit in the hash of the block at a certain height. This looks like a 50/50 outcome, but consider that a miner (or coalition of miners) on the Ethereum blockchain who produces one third of the blocks on average may decide to throw out winning blocks for which the last bit of the blockhash is 1, forgoing the block reward of approximately 2-3 ETH. In this case, the miner(s) could bias the zero outcome from a reliable 50% likelihood to a ⅔rds likelihood, leading to a potential loss of user funds from any smart contract relying on this method of randomness generation. If the contract's zero-bit behavior would benefit the miner by more than 12-18 ETH, this behavior would be economically rational.

To avoid this scenario, it is known to utilize off-chain solutions, where a random number is generated off-chain and brought on-chain. However, without cryptographic verification that the off-chain value is unbiased, there's an opportunity for the result to be manipulated by the off-chain provider and/or by the data transport layer putting that random value on-chain. Likewise, the application's users are forced to assume that the randomness is produced fairly and has been brought on-chain without being changed before being provided to the smart contract. Additional key tradeoffs and security risks when relying on a source of randomness for a smart contract include:

Inaccessibility by or incompatibility with smart contracts;
Manipulation by the random number generator's centralized operator;
Exploitation by a blockchain's miners as one of the application's users; and.
Unreasonably high trust requirements from end-users of the application.

SUMMARY

For the reasons set forth smart contracts in a decentralized environment, such as a blockchain network, cannot accept just any randomness. There is a need for "verifiable randomness." Just as network participants can validate blocks in a blockchain, so too must the randomness input into those blocks be verifiable in order to maintain the same level of determinism desired in a decentralized network such as a blockchain network.

Verifiable randomness is a known cryptographic concept. However, applicant has adapted this concept to smart contracts through the novel disclosed implementations. Essentially verifiable randomness is randomness with a cryptographic proof attached. An oracle has an associated private/public key pair (sk, pk) whose private key can be maintained off chain and whose public key pk can be published. To output a random value, the oracle applies sk to an unpredictable seed furnished by a relying contract (e.g., a block hash x and DApp-specific parameters) using a function F, yielding $y=F_{sk}(x)$ along with a proof of correctness. With knowledge of pk, it is possible to check the correctness of the proof and therefore of y. The value y is consequently unpredictable to an adversary that cannot predict or learn sk and infeasible for the service to manipulate.

In the disclosed implementations an asymmetric keypair proof is generated so that the requester can verify that the randomness was not manipulated in any way. This private/public keypair can be similar to encryption behind tech such as SSH. With this encryption system, an entity with a publicly known key can verify that another entity holds the corresponding private key which has encrypted the data. The disclosed implementations leverage a requester provided seed value incorporated into the generation of the keypair. Since the seed used to generate the randomness is intrinsically connected to the keypair, not only can the identity of the randomness provider be verified, but also the accuracy of the randomness they generated from the seed.

One aspect of the invention is a method for providing a randomness function to a smart contact on a decentralized network, the method comprising: an oracle receiving a request for at least one random value to be supplied to a smart contract executing on a decentralized network, the request including a seed; the oracle generating the at least one random value based on the seed, and a secret key associated with the oracle, wherein the oracle is identified on the decentralized network by a public key associated with the secret key; the oracle generating a cryptographic proof based on the at least one random value and the public key; and the oracle sending the at least one random value and the cryptographic proof to the decentralized network, whereby the proof, and thus the randomness of the at least one random value, can be verified. Another aspect of the invention is a computer system for accomplishing the randomness function.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various disclosed implementations. It should be understood, however, that the invention is not limited to the precise arrangements and instrumentalities shown.

DETAILED DESCRIPTION

Figure 1:
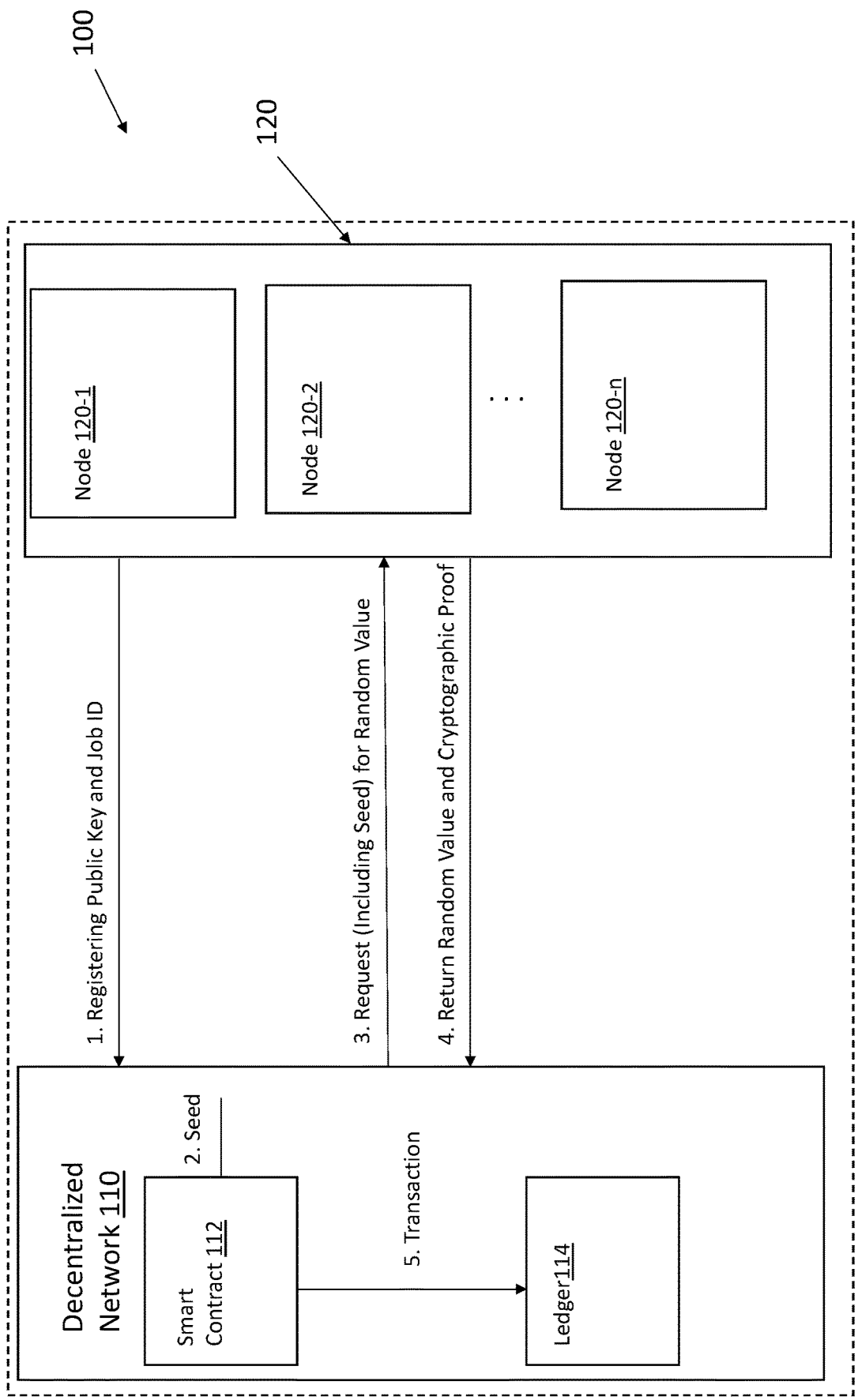
FIG. 1 is a high-level schematic illustration of the architecture and data flow of a decentralized system in accordance with disclosed implementations

Many DApps will benefit from a verifiably correct source of randomness to enable verification of their own fair operation. Examples include, Non-Fungible Tokens (NFTs), gaming DApps whose outcomes are randomized, and unconventional financial instruments (such as no-loss savings games, which allocate funds to random winners). Other blockchain and non-blockchain applications also require secure sources of randomness, including selection of decentralized-system committees and the execution of lotteries.

While block hashes can serve as a source of unpredictable randomness, they are vulnerable to manipulation by adversarial miners (and to some extent by users submitting transactions). The disclosed implementations offer a considerably more secure alternative. An oracle has an associated private/public key pair (sk, pk) whose private key is maintained off chain and whose public key pk is published. To output a random value, it applies sk to an unpredictable seed x furnished by a relying contract (e.g., a block hash and DApp-specific parameters) using a function F, yielding $y=F_{sk}(x)$ along with a proof of correctness. The resulting randomness is verifiable because, with knowledge of pk, it is possible to check the correctness of the proof and therefore of y. The value y is consequently unpredictable to an adversary that cannot predict x or learn sk and infeasible for the service to manipulate.

In disclosed implementations, a smart contract requests randomness by providing a seed to one or more oracles. The seed, which should be unpredictable to the oracles it's being provided to, is used to generate a random number, which is then sent to the smart contract on-chain. Each oracle uses its own secret key when generating randomness. When the result is published on-chain along with a proof, it is verified using the oracle's public key and the application's seed. Relying on the widely accepted signature and proof verification capabilities of a blockchain, this enables contracts to consume only randomness that has also been verified by the same on-chain environment running the contract itself.

As a result of the verifiable randomness, even if an oracle node is compromised, it cannot manipulate and/or supply biased data or the on-chain cryptographic proof would fail. The worst-case scenario is that the compromised oracle node does not return a response to a request, which will immediately and forever be visible on the blockchain. Users can avoid relying on nodes that stop responding and/or don't provide randomness with a valid proof. Even in the unlikely scenario that an oracle node is compromised, its resulting randomness cannot be manipulated. Compromised oracle nodes can only withhold a request, giving no response, for which they could be financially penalized, based on staking mechanisms for example, and/or removed from future queries that would have paid fees for their randomness. This results in a substantial economic loss for low quality and/or misbehaving oracle node operators.

Disclosed implementations can use Goldberg's Verifiable Random Function (VRF) which is available as open source code. The "random" in "verifiable random function" means "entirely unpredictable (uniformly distributed) to anyone who doesn't know the seed or secret key." A VRF can be thought of as the public-key version of keyed cryptographic hash. Only the holder of the VRF secret key can compute the hash, but anyone with the public key can verify the correctness of the hash. The disclosed implementations also include novel elements that adapt known VRFs to a decentralized environment. The VRF secret key can be a number the oracle chooses from, for example, the uniform distribution on $\{O, \ldots, \#secp256k1\text{-}1\}$, in a cryptographically secure way. Where, secp256k1 is the elliptic curve used by the Ethereum blockchain for cryptography. Associated with this secret key is a public key, which is used to identify the oracle.

FIG. 1 illustrates distributed computing system 100 in accordance with a disclosed implementation. As illustrated in FIG. 1, an oracle 120 registers the public key on-chain in association with a job-ID that the oracle 120 will respond to (Step 1). When a consuming smart contract 112 makes a request for randomness, it provides a seed (Step 2). To ensure the VRF output is hard to predict, it's good to incorporate unpredictable, hard-to-manipulate values into the seed, such as the most recent blockhash, and perhaps cryptographically attested real-world data such as the most recent price of some asset. This data can be combined into a bytes32 (a 32-byte word) to be used as the seed input using keccak256 (a cryptographic function used by the Solidity language that is used to create smart contracts on the Ethereum blockchain).

Once the decentralized network 110 has determined the seed, it broadcasts an Ethereum log requesting the corresponding VRF output from the oracle specified in the consumer request (Step 3). On seeing this log, the oracle 120 constructs the output in the following manner (Step 4). First, using the seed and the oracle's public key as inputs, the oracle "hashes the input to the curve", to obtain a cryptographically secure random sample from secp256k1. This can be accomplished by recursively hashing the inputs using keccak256 until the output is less than the order of secp256k1's base field ("p" in that secp256k1 description), and is the x ordinate of some point (x,y) on secp256k1 (i.e., $y^2=x^3+7$ in the base field). The pair (x,y) is then the hash of the input to the curve. The oracle then multiplies (x,y), as a secp256k1 curve point by its secret key to obtain a point γ. The keccak256 hash of γ, as a uint256, is the VRF output. It generates a proof that γ is the same multiple of (x,y) as the oracle's public key is of the secp256k1 generator. In disclosed implementations, this proof can securely sample a nonce n from {O, . . . , #secp256k1-1}, much as it did for its secret key. The proof then computes u=n×g, where g is the secp256k1 generator, and takes the Ethereum address of u. Then it computes v=n×(x,y). Next, it hashes together (x,y), its VRF public key, γ, the address of u, and v, takes the remainder of that hash modulo #secp256k1, and calls that c. Finally, it computes s=n−c×k modulo #secp256k1, where k is its secret VRF key. The proof is then its public key, γ, c, s, and its input seed. This is sent back to the decentralized network 110 (Step 4), which verifies the proof, and, assuming the proof verifies, sends the output back to the consuming contract 112. Instead of doing gas-inefficient elliptic curve multiplications directly in the contract, the multiplications can be accomplished off-chain and the multiplication result can be provided as an additional input to the contract. The contract can then use an ECRECOVER operation (which is much more gas-efficient than EC multiplication) to check that the provided multiplication result is correct as discussed below.

To check the proof, the contract can: check that the public key and γ are valid secp256k1 points; verify that the address of the point c×pk+s×g matches the address of u, (where pk is the oracle public key); compute the "hash to curve" (x,y) from the public key and the seed; and check that the hash of h, its public key, γ, the address of u, and c×γ+s×(x,y) matches c.

Unfortunately, scalar multiplications on secp256k1 like c×γ are extremely expensive to compute directly on the EVM, so for efficiency, "a procedure can be used to verify that a witness passed into the proof as c×γ, actually matches the product c×γ. Such a procedure was published in a forum post at https://ethresear.ch/t/you-can-kinda-abuse-ecrecover-to-do-ecmul-in-secp256k1-today/2384), where it is described how one can use ECRECOVER to make elliptic curve multiplications more gas-efficient on Ethereum. In this way, we push the burden of actually computing c×γ off-chain, and only have to verify that the value we've been passed as c×γ actually is c×γ, which is much cheaper. Thus, in addition to the above inputs/steps, the on-chain verification of a proof involves witnesses for c×γ and s×(x,y), and verification includes checking that these witnesses are valid secp256k1 curve points, and match the products they purport to be, using Vitalik's trick. In addition, we use the Ethereum address for u, and check that it matches the point c×pk+s×g using Vitalik's trick. Once the proof has been checked, a transaction can be recorded on a distributed ledger 114 of the decentralized network 110. Once the proof has been checked, the random value can be processed and a transaction can be recorded in the ledger 114 of the decentralized network 110.

Further, the CHAINLINK™ approach to highly scalable and cost-effective decentralization of oracle networks using threshold signatures will also provide extreme decentralization and availability for the VRF disclosed herein. In brief, the CHAINLINK™ approach provides a decentralized network of oracle nodes that respond to requests for data. The response data from multiple nodes is aggregated, based on various algorithms, and broadcast as a result in a single transaction. Therefore, oracle 120 can include plural oracle nodes 120-1 . . . 120-n. By combining these two approaches, the benefits of the VRF's unique ability to provide on-chain verifiable randomness, combined with the ability to cost-efficiently have thousands of nodes providing VRF's uptime/availability are obtained.

By allowing the wider ecosystem of CHAINLINK™ nodes to participate in VRF random number generation, a globally distributed network of node operators that are economically incentivized to both generate and broadcast verifiable random data on-chain is achieved. The use of CHAINLINK™ Threshold Signatures in combination with a highly decentralized network of node operators will help prevent adversaries from, for example, stealing user funds. The responses from VRF are verifiable on-chain and have extreme uptime/availability. The disclosed implementations can be combined with Verifiable Delay Functions (VDF), i.e., functions that require a moderate amount of sequential computation to evaluate, but once a solution is found, the correctness thereof can be easily verified, and other methods of generating randomness, both on-chain and off-chain.

Figure 2:
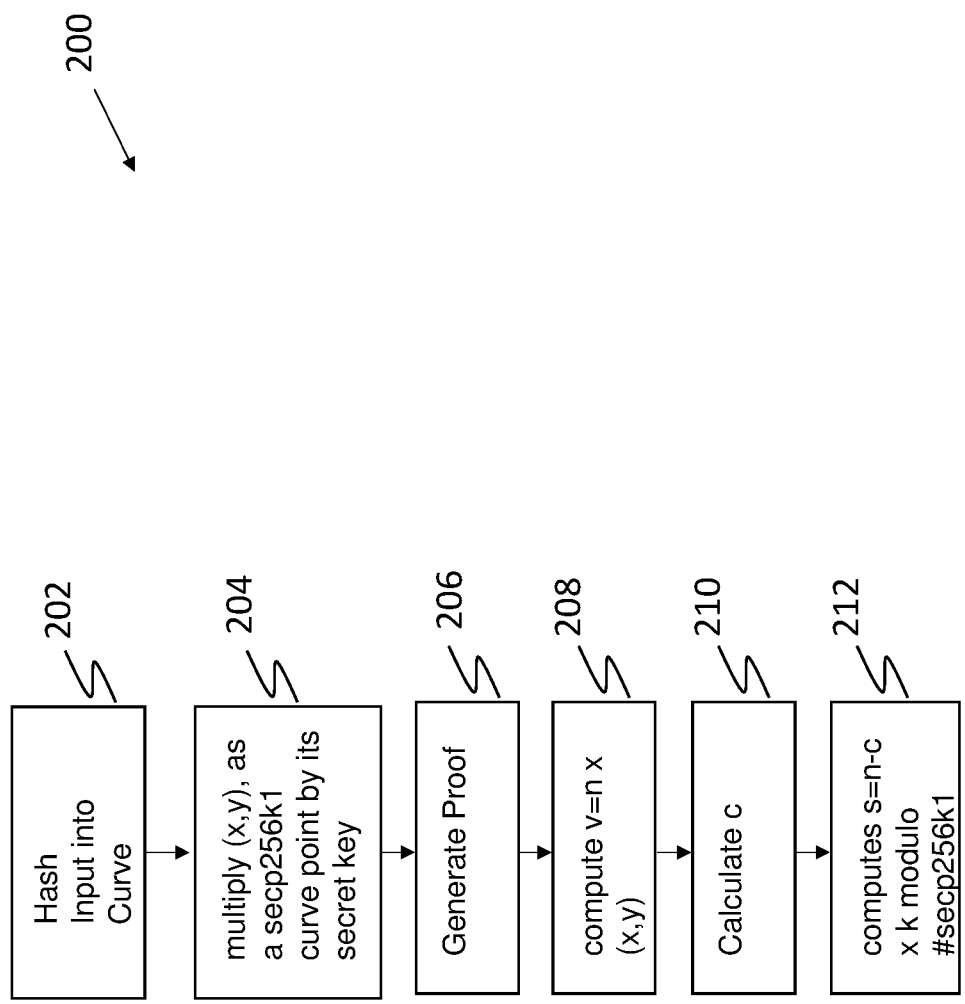
FIG. 2 is a flowchart of a randomness function in accordance with disclosed implementations.

FIG. 2 illustrates the method steps for an oracle to generate the randomness function described above. As illustrated in FIG. 2, method 200 includes using the above-described seed and the oracle's public key as inputs. The oracle "hashes the input to the curve", to obtain a cryptographically secure random sample from secp256k1 at 202. This can be accomplished by recursively hashing the inputs using keccak256 until the output is less than the order of secp256k1's base field ("p" in that secp256k1 description), and is the x ordinate of some point (x,y) on secp256k1 (i.e., $y^2=x^3+7$ in the base field). The pair (x,y) is then the hash of the input to the curve. The oracle then multiplies (x,y), as a secp256k1 curve point by its secret key to obtain a point γ at 204. The keccak256 hash of γ, as a uint256, is the VRF output. It generates a proof that γ is the same multiple of (x,y) as the oracle's public key is of the secp256k1 generator at 206. In disclosed implementations, this proof can securely sample a nonce n from {O, . . . , #secp256k1-1}, much as it did for its secret key. The proof then computes u=n×g, where g is the secp256k1 generator, and takes the Ethereum address of u. Then it computes v=n×(x,y). Next, it hashes together (x,y), its VRF public key, γ, the address of u, and v, takes the remainder of that hash modulo #secp256k1, and calls that c at 210. Finally, it computes s=n−c×k modulo #secp256k1, where k is its secret VRF key, at 212. The proof is then its public key, γ, c, s, and its input seed.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for providing a randomness function to a smart contact on a decentralized network, the method comprising:
    an oracle receiving a request for at least one random value to be supplied to a smart contract executing on a decentralized network, the request including a seed;
    the oracle generating the at least one random value based on the seed, and a secret key associated with the oracle, wherein the oracle is identified on the decentralized network by a public key associated with the secret key;
    the oracle generating a cryptographic proof based on the at least one random value and the public key; and
    the oracle sending the at least one random value and the cryptographic proof to the decentralized network, whereby the proof, and thus the randomness of the at least one random value, can be verified.

2. The method of claim 1, further comprising, the oracle registering the public key on the decentralized network in association with a job-ID corresponding to the request.

3. The method of claim 2, wherein the request is broadcast from the decentralized network.

4. The method of claim 3, wherein the request is broadcast in response to generation of the seed by the smart contract.

5. The method of claim 3, wherein generating the at least one random value comprises applying an elliptic curve cryptographic algorithm using the seed and the public key as inputs to obtain a data pair (x,y), multiplying (x,y) by the secret key to obtain a point and applying a hash function to the point to obtain the random value.

6. The method of claim 5, where generating a cryptographic proof comprises generating a proof that the point is the same multiple of (x,y) as the public key is of the elliptic curve cryptographic algorithm's generator.

7. The method of claim 5, wherein the elliptic curve cryptographic algorithm is secp256k1 and the hash function is the keccak256 function.

8. The method of claim 1, wherein the decentralized network is a blockchain that records transactions in blocks of data and wherein the oracle generating at least one random value comprises generating at least one random value based on the seed, a secret key associated with the oracle, and the blockhash of the block in which the transaction containing the request was made.

9. The method of claim 1, wherein the oracle comprises a decentralized network of oracle nodes.

10. The method of claim 1, wherein the request for at least one random value to be supplied to a smart contract is received from the smart contract.

11. A system for providing a randomness function to a smart contact on a decentralized network, the system comprising:
    at least one processor;
    at least one memory device storing computer-readable instructions which, when executed by the at least one processor, cause the at least one processor to carry out the method of:
        an oracle receiving a request for at least one random value to be supplied to a smart contract executing on a decentralized network, the request including a seed;
        the oracle generating the at least one random value based on the seed, and a secret key associated with the oracle, wherein the oracle is identified on the decentralized network by a public key associated with the secret key;
        the oracle generating a cryptographic proof based on the at least one random value and the public key; and
        the oracle sending the at least one random value and the cryptographic proof to the decentralized network, whereby the proof, and thus the randomness of the at least one random value, can be verified.

12. The system of claim 11, wherein the method further comprises the oracle registering the public key on the decentralized network in association with a job-ID corresponding to the request.

13. The system of claim 12, wherein the request is broadcast from the decentralized network.

14. The system of claim 13, wherein the request is broadcast in response to generation of the seed by the smart contract.

15. The system of claim 13, wherein generating the at least one random value comprises applying an elliptic curve cryptographic algorithm using the seed and the public key as inputs to obtain a data pair (x,y), multiplying (x,y) by the secret key to obtain a point and applying a hash function to the point to obtain the random value.

16. The system of claim 15, where generating a cryptographic proof comprises generating a proof that the point is the same multiple of (x,y) as the public key is of the elliptic curve cryptographic algorithm's generator.

17. The system of claim 15, wherein the elliptic curve cryptographic algorithm is secp256k1 and the hash function is the keccak256 function.

18. The system of claim 11, wherein the decentralized network is a blockchain that records transactions in blocks of data and wherein the oracle generating the at least one random value comprises generating at least one random value based on the seed, a secret key associated with the oracle, and the blockhash of the block in which the transaction containing the request was made.

19. The system of claim 11, wherein the oracle comprises a decentralized network of oracle nodes.

20. The system of claim 11, wherein the request for at least one random value to be supplied to a smart contract is received from the smart contract.

21. A method for providing a randomness function to a smart contact on a decentralized network, the method comprising:
   an oracle receiving a request for at least one random value to be supplied to a smart contract executing on a decentralized network, the request including a seed;
   the oracle generating the at least one random value based on the seed, and a secret key associated with the oracle, wherein the oracle is identified on the decentralized network by a public key associated with the secret key;
   the oracle generating a cryptographic proof based on the at least one random value and the public key; and
   the oracle sending the at least one random value and the cryptographic proof to the decentralized network, whereby the proof, and thus the randomness of the at least one random value, can be verified, wherein the oracle generating the at least one random value based on the seed, and a secret key associated with the oracle includes:
   hashing the input to the curve, to obtain a cryptographically secure random sample from secp256k1 by recursively hashing the inputs using keccak256 until the output is less than the order of secp256k1's base field ("p" in that secp256k1 description), and is the x ordinate of some point (x,y) on secp256k1 (i.e., $y2=x3+7$ in the base field) where by a pair (x,y) is then the hash of the input to the curve; and
   multiplying (x,y), as a secp256k1 curve point by the secret key to obtain a point $\gamma$, wherein the keccak256 hash of $\gamma$, as a uint256, is the random output; and
   wherein generating a cryptographic proof based on the at least one random value and the public key includes generating a proof that $\gamma$ is the same multiple of (x,y) as the oracle's public key is of the secp256k1 generator by:
   sampling a nonce n from {O, . . . , #secp256k1-1}, computing u=n×g,
   where g is the secp256k1 generator, computing v=n×(x, y);
   hashing together (x,y), its VRF public key, $\gamma$, the address of u, and v;
   taking the remainder of that hash modulo #secp256k1 as c; and
   computing s=n−c×k modulo #secp256k1, where k is its secret VRF key, whereby the proof is then the public key, $\gamma$, c, s, and the seed.

* * * * *